US005781405A

United States Patent [19]
Vossler

[11] Patent Number: 5,781,405
[45] Date of Patent: Jul. 14, 1998

[54] ELECTRONIC DEVICE HAVING ROTATABLY MOUNTED INFRARED DEVICE WITH A PAIR OF PEGS FITTING INTO A PAIR OF HOLES

[75] Inventor: Stephen P. Vossler, Sioux Falls, S. Dak.

[73] Assignee: Gateway 2000, Inc., North Sioux City, S. Dak.

[21] Appl. No.: 720,460

[22] Filed: Sep. 30, 1996

[51] Int. Cl.⁶ .................................. G06F 1/16; H05K 7/16
[52] U.S. Cl. ........................................... 361/686; 361/681
[58] Field of Search ..................... 364/708.1; 361/681, 361/686; 342/53

[56] References Cited

U.S. PATENT DOCUMENTS

| D. 317,005 | 5/1991 | Wickrema et al. ............. D14/107 |
| 5,217,296 | 6/1993 | Tanner et al. . |
| 5,221,919 | 6/1993 | Hermans . |
| 5,227,953 | 7/1993 | Lindberg et al. ............. 361/686 |
| 5,440,292 | 8/1995 | Bedrosian . |
| 5,481,616 | 1/1996 | Freadman . |

OTHER PUBLICATIONS

"A Discussion of Infrared—Its Adoption and Applications", *Adaptec White Paper*, from Adaptec web site, pp. 1–5 (Jun. 18, 1996).

"ACTiSYS IrDA and Dual-Mode IR Printer Adapter", Product Information from ACTiSYS web site, 1 pg (Jun. 18, 1996)

"FlexCam", *Videolabs Product Brochure*, Cover page, and pp. 4, 6 and 7 (Publication Date Unknown).

"Integrated Infrared Transceiver Module", TFDS6000 Preliminary Information, Temic Telefunken Semiconductors, pp.1–7 (Jul. 11, 1995).

"IrDA SIR Integrated Transceiver", TFDS3000 Preliminary Specification, Temic Telefunken Semiconductors, pp. 1–6 (Jun. 10, 1995).

"Serial Infrared Adapters", Product Information from IBM web site, pp. 1–3 (Jun. 18, 1996).

J. deJong, "Road Show: Vidoeconferencing for Notebooks", *Computer Shopper*, pp. 276–277 (Nov. 1995).

J M Jutila, "Wireless Laser Networking; Industry Trend or Event", *Telecommunications, Inc.*, vol. 30, No. 2, pp. 13–18 (Feb. 1996).

S. Rybicki, et al., "Wireless IR lets Mobile-Device Users get Personal", *Electronic Engineering Times*, No. 889, pp. 6–10 (Feb. 19, 1996).

*Primary Examiner*—Michael W. Phillips
*Attorney, Agent, or Firm*—Schwegman, Lundberg, Woessner & Kluth, P.A.

[57] ABSTRACT

An adjustably mounted infrared device for an electronic device is disclosed. One embodiment of the invention is a computer. The computer has a housing and an integral infrared device. The housing has a plurality of surfaces to protect at least a processor within the housing. The integral infrared device is mounted adjustably to the housing to permit positioning of the device in a desired direction independent of movement of the housing. Other embodiments of the invention include a computer keyboard, a computer printer, and a computer monitor, each having such an integral infrared device mounted adjustably thereto to permit position of the device in a desired direction without movement of the keyboard, the printer or the monitor, respectively. The infrared device is contained within a casing. The casing is rotatably mounted by a pair of pegs which fit into a pair of holes located within the housing.

7 Claims, 12 Drawing Sheets

ELECTRONIC DEVICE HAVING ROTATABLY MOUNTED INFRARED DEVICE WITH A PAIR OF PEGS FITTING INTO A PAIR OF HOLES

FIELD OF THE INVENTION

This invention relates generally to infrared devices for electronic devices such as computers and computer peripherals, and more particularly to such devices that are adjustably mounted.

BACKGROUND OF THE INVENTION

Historically computers have connected to peripherals through the use of cables. A cable may, for example, connect a computer to a peripheral such as a printer or a monitor. A cable may also permit a computer to connect into a network, such as a local-area network or a wide-area network. As a way to provide for such connectivity, cables have the advantage of permitting reliable communication at relatively low cost.

Cables are typically best used in environments in which computers and peripherals are relatively stationery, and do not need to be moved around frequently. Connecting a peripheral to a computer by cable, for example, usually entails turning off both the peripheral and the computer, and plugging the cable into a port in the back of each of the peripheral and the computer. This is typically an inconvenience for the user, reduced only by the fact that it usually needs to be accomplished only once. After the peripheral has been connected to the computer, it usually is not disconnected. That is, both the peripheral and the computer typically remain in the same location.

However, this paradigm of connectivity has changed in light of the increasing portability of computers. Laptop and notebook computers, for example, by their very nature are not used only in one location. A user may use a laptop computer at work, at home, and while traveling on business. In such situations, the need to constantly plug and unplug cables to communicate with peripherals is a great inconvenience for the user. Moreover, the user may misplace the cable, or worse, plug the wrong type of cable into the computer and ruin the computer, the peripheral, or both.

A new paradigm of connectivity has come into place to alleviate these problems and inconveniences. Rather than using a cable to connect a computer to a peripheral to achieve "wired communication", there now is "wireless communication". One type of wireless communication is infrared communication. Rather than having to plug a cable into both the computer and the peripheral, a user instead only has to line up an infrared transceiver of the computer with the infrared transceiver of the peripheral. Infrared communication is especially desirable for laptop computer users, who frequently move about with their computers.

Typically, however, infrared communication requires that the transceiver at each end be within the same line of sight. An infrared transceiver of a computer, for example, may require that it be lined up within about fifteen degrees of an infrared receiver of a peripheral to permit infrared wireless communication between the two. If the transceivers do not so line up with one another, communication between the computer and the peripheral may be interrupted.

Typically, the infrared transceiver of the computer is located on the back of the computer, and the infrared transceiver on the front of the peripheral. This means that the user of the computer must use the computer directly in front of the peripheral in order to communicate with it. The user of the computer is thus greatly restricted in where he or she can locate the computer relative to the peripheral.

Furthermore, frequently laptop computers communicate with one another in a peer-to-peer manner. In the case where the infrared receiver of each computer is located on the back of the computer, this means that the computers must be aligned with one another back-to-back to permit infrared wireless communication between the computers. This presents the users of these computers with a great inconvenience, in that they are forced to work head-to-head with one another.

Optionally, the infrared transceiver of one or both of the computer and the peripheral is located on a dongle that attaches to a cable to the computer. In this situation, the user has more freedom in moving the computer while still communicating wirelessly with the peripheral. However, dongles have the potential of becoming lost, and in any case typically tie up a communications port on the back of the computer. Furthermore, the addition of yet another cable to be connected in the back of the computer increases the potential for the tangling of cables. The dongles are also difficult to store when not in use (i.e., when the computer is moved from one location to another), and take up scarce desk-top space.

There is a need, therefore, for an infrared transceiver of a computer or a computer peripheral that permits wireless infrared communication while not greatly restricting the location in which either the computer or the peripheral can be used, and not causing peer-to-peer communications among computers to be overly incovenient for their users. There is a further need for such an infrared transceiver that is not encased within a dongle that attaches to either the computer or the peripheral.

SUMMARY OF THE INVENTION

The present invention provides for an adjustably mounted infrared device for an electronic device. A first embodiment of the invention is a computer. The computer has a housing and an integral infrared device. The housing has a plurality of surfaces to protect at least a processor within the housing. The integral infrared device is mounted adjustably to the housing to permit positioning of the device in a desired direction independent of movement of the housing.

In this manner, the present invention provides for a number of advantages. The location in which the computer can be used is not restricted. Because the infrared device is mounted adjustably to the housing, it can be aimed to lie within the line of sight of an infrared transceiver of a peripheral or another computer, without having to move the housing of the computer itself. Thus, for example, the computer does not have to be located directly in front of the peripheral, but rather can be positioned off to either side of the peripheral, and have its infrared device suitably adjusted to permit wireless communication. Furthermore, computers communicating to one another in a peer-to-peer manner do not have to be positioned back-to-back with one another.

Moreover, the infrared device of the present invention is not a dongle, and therefore is not to prone to becoming lost or misplaced by a user. The lack of a dongle also means that the potential for cable tangle is greatly reduced. Because the infrared device of the present invention is integrated within the computer itself, the device also does not take up scarce desk space.

Other embodiments of the invention include a computer keyboard having such an integral infrared device adjustably mounted to a housing of the keyboard, as well as a computer monitor also having such an integral infrared device adjustably mounted to a housing of the monitor, and a computer printer having such an integral infrared device adjustably mounted thereto. Still other and further embodiments, aspects and advantages of the present invention will become apparent in the following description and by reference to the accompanying drawings.

DETAILED DESCRIPTION OF THE INVENTION

Figure 1:
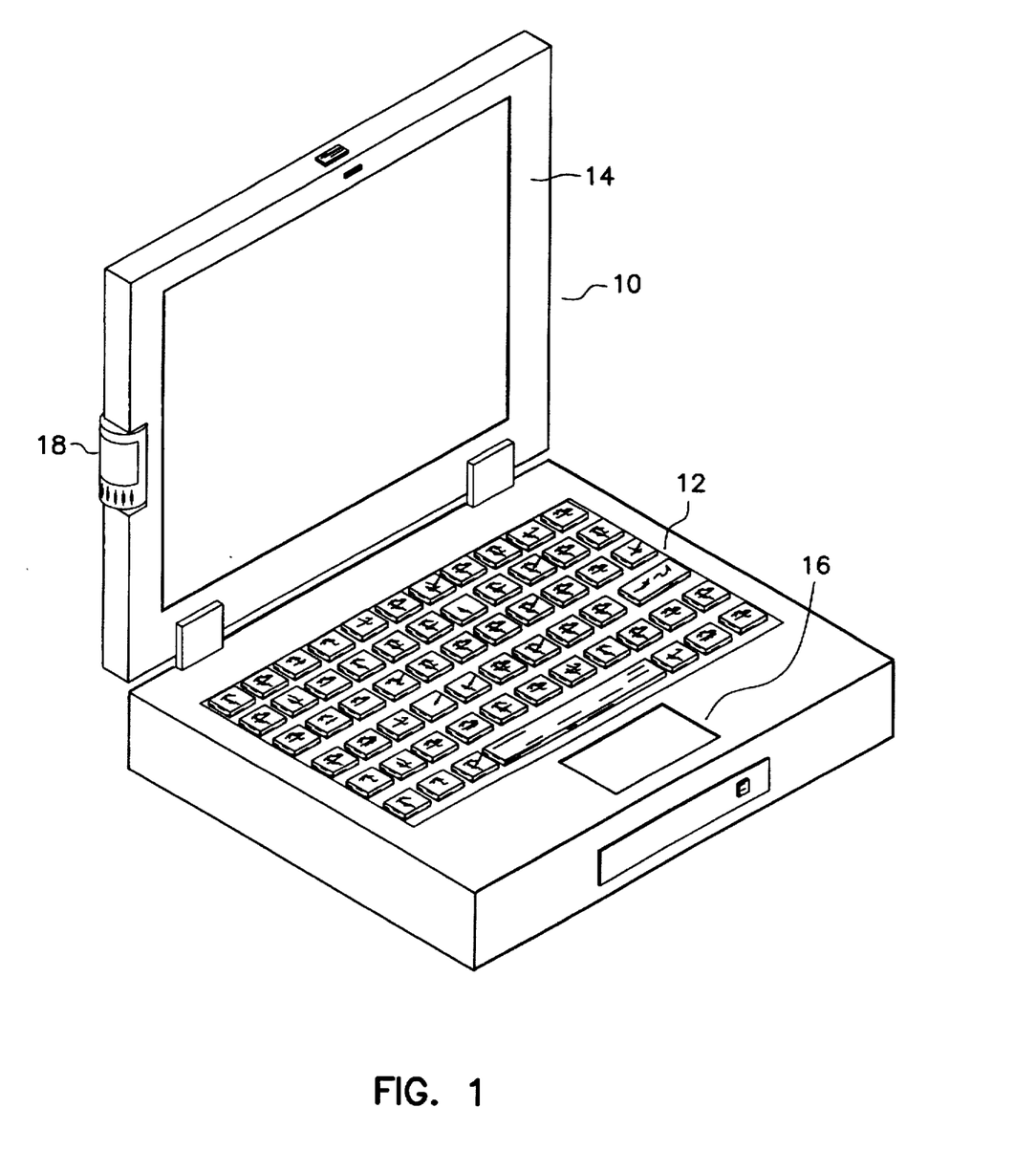
FIG. 1 is a diagram of a typical computer according to the present invention.

The present invention provides for an adjustably mounted infrared device for an electronic device such as a computer or a computer peripheral. A diagram of a typical computer in conjunction with which the present invention can be used is shown in FIG. 1. Computer 10 usually includes keyboard 12, display device 14 and pointing device 16. Not shown is that computer 10 also typically comprises a random-access memory (RAM), a central-processing unit (CPU), and one or more storage devices, such as a hard disk drive, a floppy disk drive, a CD-ROM drive, or a tape cartridge drive, although the invention is not so limited. As shown, computer 10 is a laptop computer, such as a GATEWAY 2000 SOLO laptop computer, although the invention is not so limited. For example, computer 10 could also be a desktop computer such as a Gateway 2000 desktop computer.

As shown in FIG. 1, display device 14 is a flat-panel display device such as a liquid crystal display (LCD). However, the invention is not so limited; display device 14 can be any of a number of different devices. Pointing device 16 as shown in FIG. 1 is a touch pad, although the invention is also not so limited. For example, pointing device 16 may also be a mouse, or a trackball, without departing from the spirit or scope of the present invention.

Computer 10 also includes integral and adjustably mounted infrared device 18. Infrared device 18 includes an infrared transceiver to allow for wireless (infrared) communication with another infrared transceiver. The invention is not limited to any particular transceiver, however. In one embodiment, the transceiver is a TFDS3000 IrDA SIR Integrated Transceiver available from Telefunken Semiconductors. In another embodiment, the transceiver is a TFDS6000 transceiver also available from Telefunken Semiconductors. Such infrared transceivers are well known to those of ordinary skill within the art.

Infrared device 18 is integral to computer 10 in that it does not couple to computer 10 via a cable plugging into a port of computer 10. That is, device 18 is not a dongle. Furthermore, device 18 is adjustably mounted to computer 10 in that it can be positioned in a particular direction without having to move computer 10 itself. That is, computer 10 can remain stationary, while the direction in which the transceiver of device 18 is pointed can still be varied. The present invention is not limited to the manner by which infrared device 18 is adjustably mounted to computer 10 to permit such positioning of device 18. Several different embodiments of the invention in which device 18 is adjustably mounted to computer 10 in different manners are described herein.

As those of ordinary skill within the art understand, the infrared transceiver of device 18 must be within the same line of sight as another infrared transceiver in order for infrared wireless communication between the two transceivers to occur. Therefore, the present invention provides for the advantage of great freedom in the positioning of computer 10 relative to the computer or peripheral within which the other infrared transceiver is located. For example, the infrared transceiver with which the infrared transceiver of device 18 of computer 10 communicates may be within a computer peripheral such as a printer. In such instance, rather than having to be located directly in front of the printer, computer 10 can be located to either side of the printer, so long as device 18 can be adjusted to permit the transceiver of device 18 to be within the same line of sight as the transceiver of the peripheral.

The present invention is not limited to device 18 being mounted on any particular surface of computer 10. As shown in FIG. 1, device 18 is mounted on an edge of computer 10 to the left of display device 14. However, device 18 could be mounted on any surface or any edge of computer 10, without departing from the spirit or scope of the invention. For example, device 18 in another embodiment is mounted on the flat surface below keyboard 12 and to the left of pointing device 16. In yet another embodiment, device 18 is mounted on the edge to the left of keyboard 12.

Figure 2:
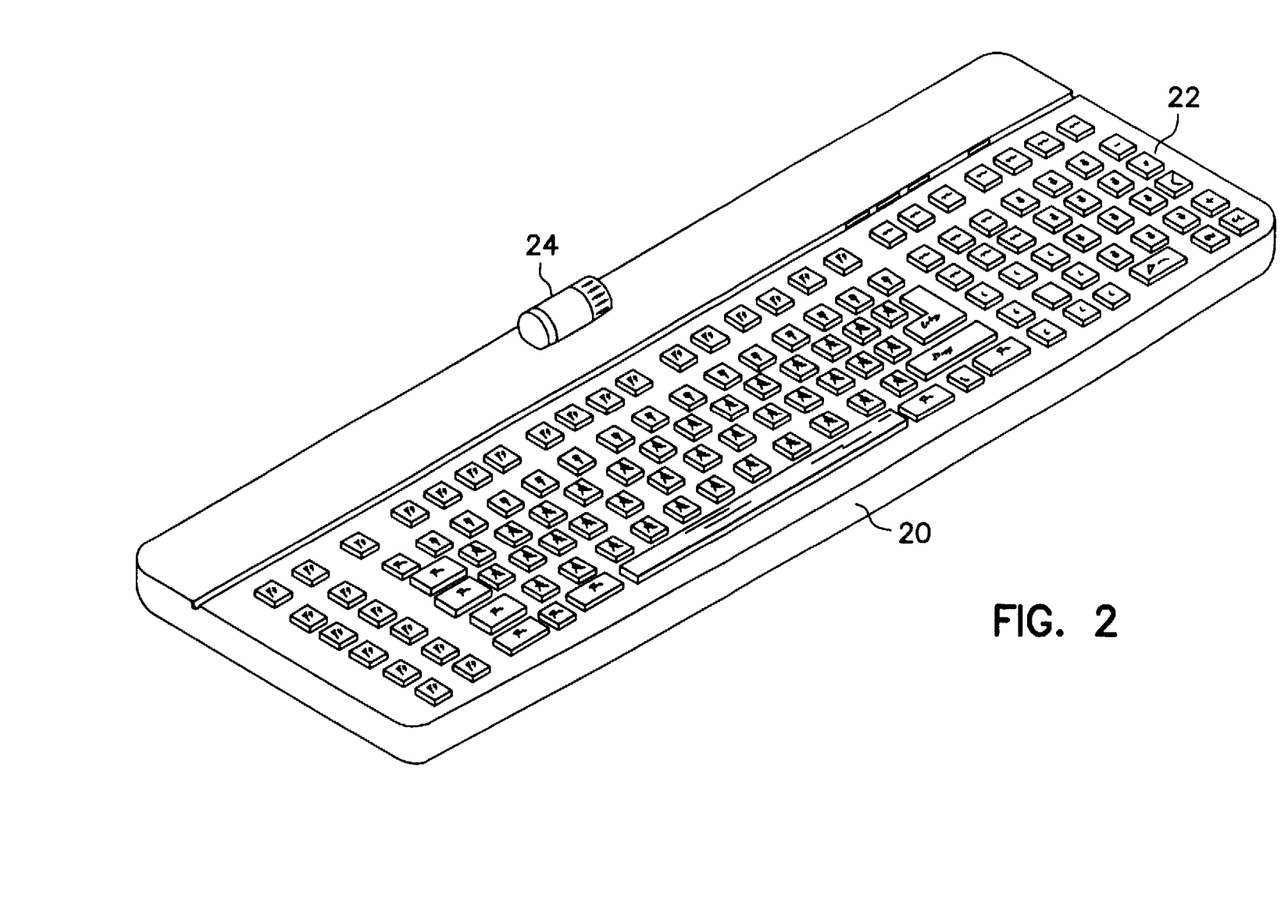
FIG. 2 is a diagram of a typical keyboard according to the present invention.

Referring now to FIG. 2, a computer keyboard according to the present invention is shown. Computer keyboard 20 includes keys 22 and infrared device 24. Most computer keyboards can be modified to include such an infrared device 24, and the present invention is not limited to any particular keyboard. Infrared device 24 corresponds to infrared device 18 of computer 10 of FIG. 1, and reference should be made to discussion of infrared device 18 for further understanding thereto. Like infrared device 18, infrared device 24 is integral to keyboard 20, and is adjustably mounted to keyboard 20. Furthermore, infrared device 24 can be mounted on any surface or edge of keyboard 20, without departing from the spirit or scope of the present invention.

Figure 3:
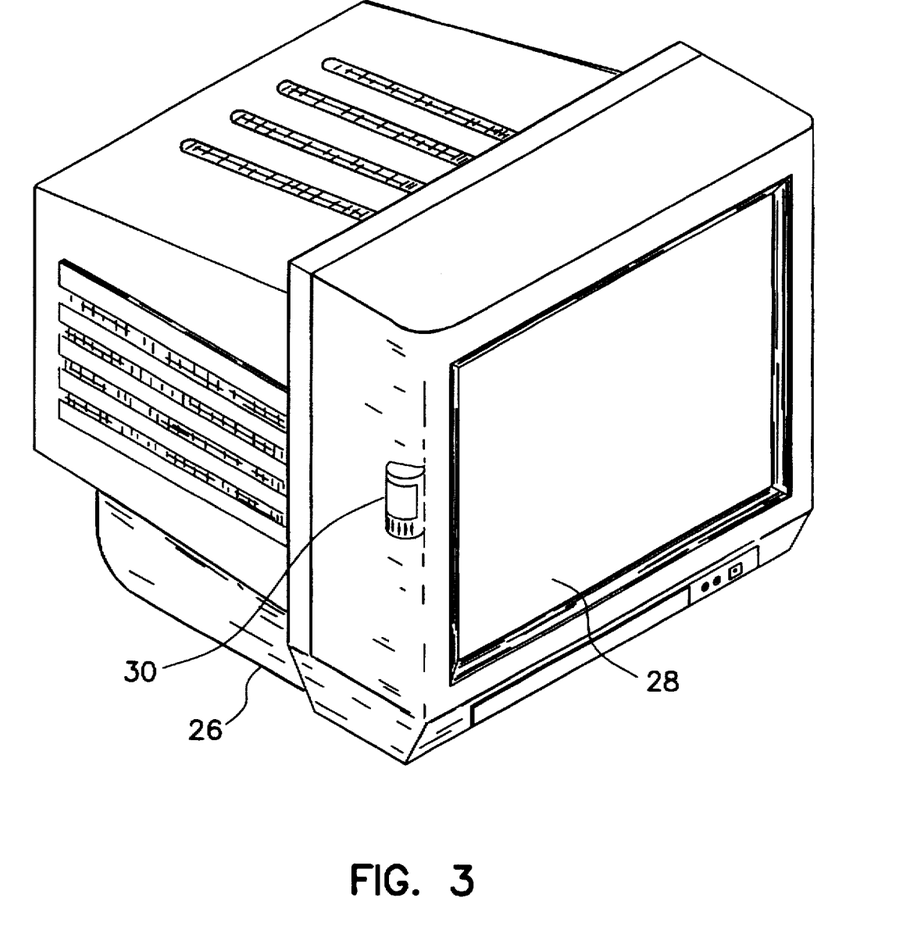
FIG. 3 is a diagram of a typical monitor according to the present invention.

Referring now to FIG. 3, a computer monitor according to the present invention is shown. Computer monitor 26 includes display device 28 and infrared device 30. Display device 28 can be any of a number of different display devices, including a cathode-ray tube (CRT), without departing from the spirit or scope of the present invention. Thus, most monitors can be modified to include such an infrared device 30, and the present invention is not limited to any particular monitor. Infrared device 30 corresponds to infrared device 18 of computer 10 of FIG. 1, and reference should be made to discussion of infrared device 18 for further understanding thereto. Like infrared device 18, infrared device 30 is integral to monitor 26, and is adjustably mounted to monitor 26. Furthermore, infrared device 30 can be mounted on any surface or edge of monitor 26, without departing from the spirit or scope of the present invention.

As those of ordinary skill within the art readily recognize, the present invention is not limited to the electronic devices described (i.e., a computer monitor, a computer keyboard and a computer). That is, the present invention can be applied to any electronic device—for example, any computer peripheral—which achieves wireless communication via an infrared transceiver. For example, the present invention may be modified to be mounted on an electronic device such as a printer for a computer, as commonly understood by those of ordinary skill within the art. In this case, the printer may be of any type, and the present invention is not limited to any particular kind of printer. In one embodiment of the invention, the printer is a laser printer or ink jet printer as commonly available from manufacturers such as Hewlett Packard and Canon. As has been shown and described in the case of a computer, computer monitor and computer keyboard, an infrared device is mounted adjustably to the computer printer, in the same manner as device 18 is mounted adjustably mounted to computer 10 as in FIG. 1. For further understanding thereto, reference should be made to FIG. 1 and the discussion made in conjunction with FIG. 1.

Figure 4:
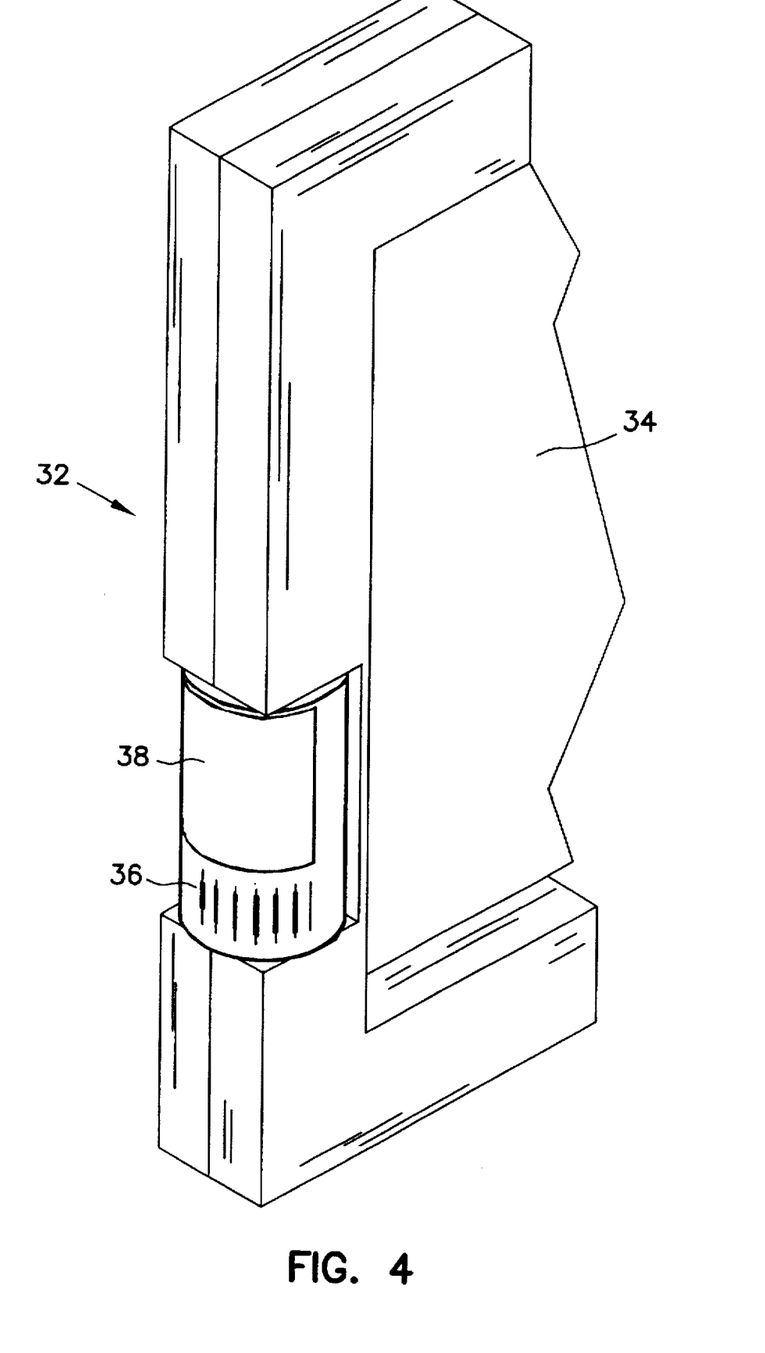
FIG. 4 is a perspective view of one embodiment of an infrared device according to the present invention.

Referring now to FIG. 4, one embodiment of an infrared device according to the present invention is shown. Infrared device 36 corresponds to infrared device 18 of FIG. 1, infrared device 24 of FIG. 2, and infrared device 30 of FIG. 3. Infrared device 36 includes transmission opening 38. Transmission opening 38 is a lens that protects an infrared transceiver disposed within infrared device 36, but which still allows the passing through of infrared signals. In one embodiment of the invention, opening 38 is a infrared-transparent plastic sheet.

Infrared device 36 is mounted rotatably within an edge of computer 32, computer 32 also having display device 34. As shown in FIG. 4, computer 32 corresponds to computer 10 of FIG. 1, and display device 34 corresponds to display device 14 of FIG. 1. However, infrared device 36 can also be mounted within keyboard 20 of FIG. 2 or monitor 26 of FIG. 3 without departing from the spirit or scope of the present invention.

Infrared device 36 is mounted rotatably within an edge of computer 32 such that it can rotate within computer 32 about an axis of rotation as is shown in FIG. 4. Infrared device 36 rotates within the socket of computer 32 in which it is located. In this manner, a user of the computer can aim infrared device 36 towards another infrared device without having to actually move computer 36. This provides the user with greater freedom in locating the computer while conducting infrared wireless communication.

Figure 5:
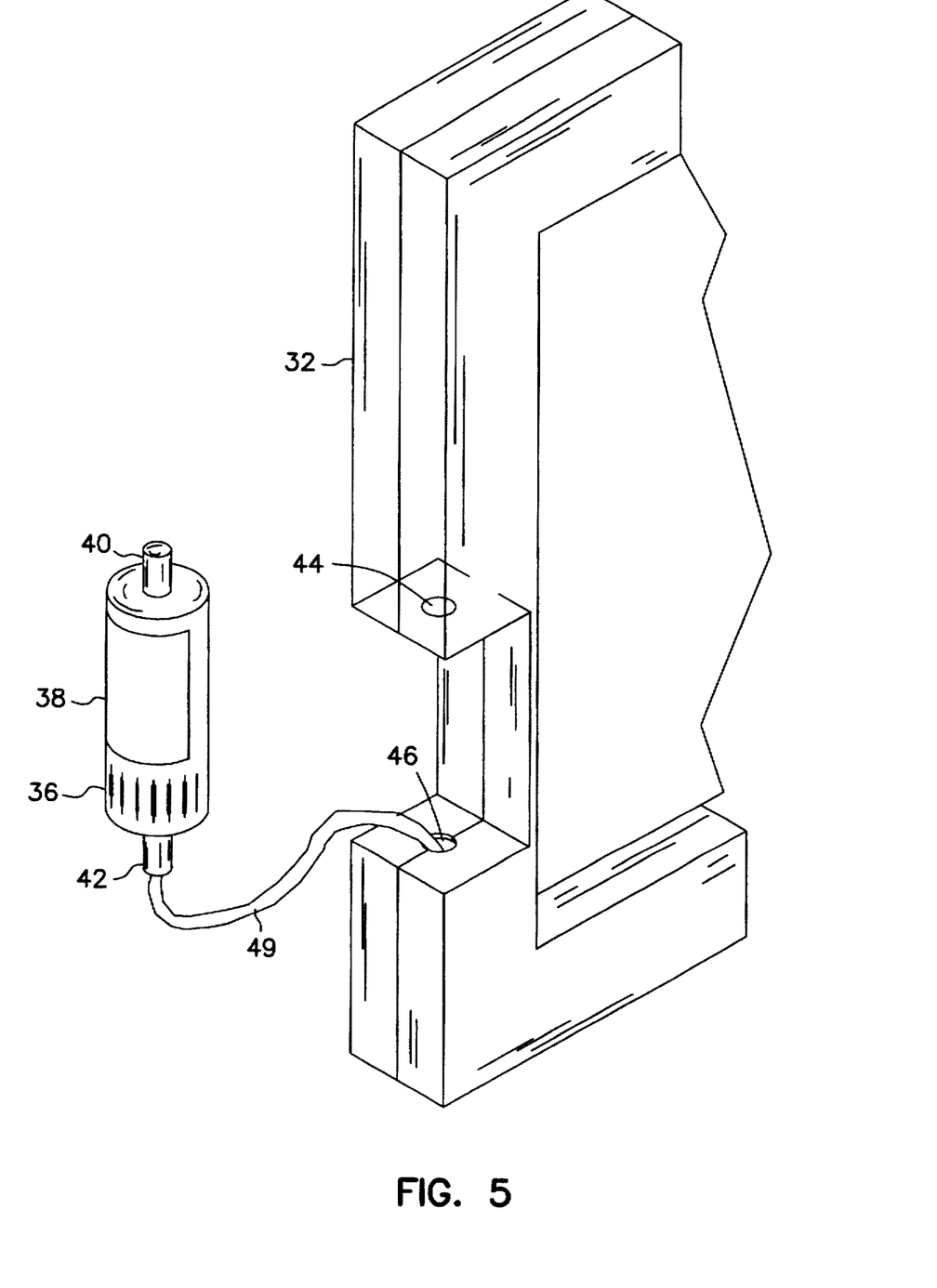
FIG. 5 is an exploded perspective view of the embodiment of FIG. 4.

One manner in which infrared device 36 is adjustably mounted within computer 32 is shown in FIG. 5. As shown in FIG. 5, infrared device 36, besides having transmission opening 38, also has pegs 40 and 42, with peg 40 mounted on the top of infrared device 36, and peg 42 mounted on the bottom of infrared device 36. The top surface of the socket of computer 32 in which infrared device 36 is mounted has a hole 44 corresponding to peg 40, while the bottom surface of the socket of computer 32 in which device 36 is mounted has a hole 46 corresponding to peg 42. As rotatably mounted within computer 36, peg 40 of device 36 fits into hole 44, and peg 42 of device 36 fits into hole 46. Each of the pegs fits into its corresponding hole loosely enough to permit device 36 to rotate within the socket.

Infrared device 36 is also electrically coupled to computer 32 by electrical wire or cable 49, as those skilled in the art will readily appreciate. The present invention is not limited to the manner in which device 36 is electrically coupled to computer 36. However, in one embodiment of the invention, electrical wire or cable 49 connects device 36 to computer 32 through a hole in peg 42, and into hole 46. The electrical coupling permits device 36 to send electrical signals received at device 36 to computer 36, and to receive electrical signals from computer 32 as well.

Figure 6:
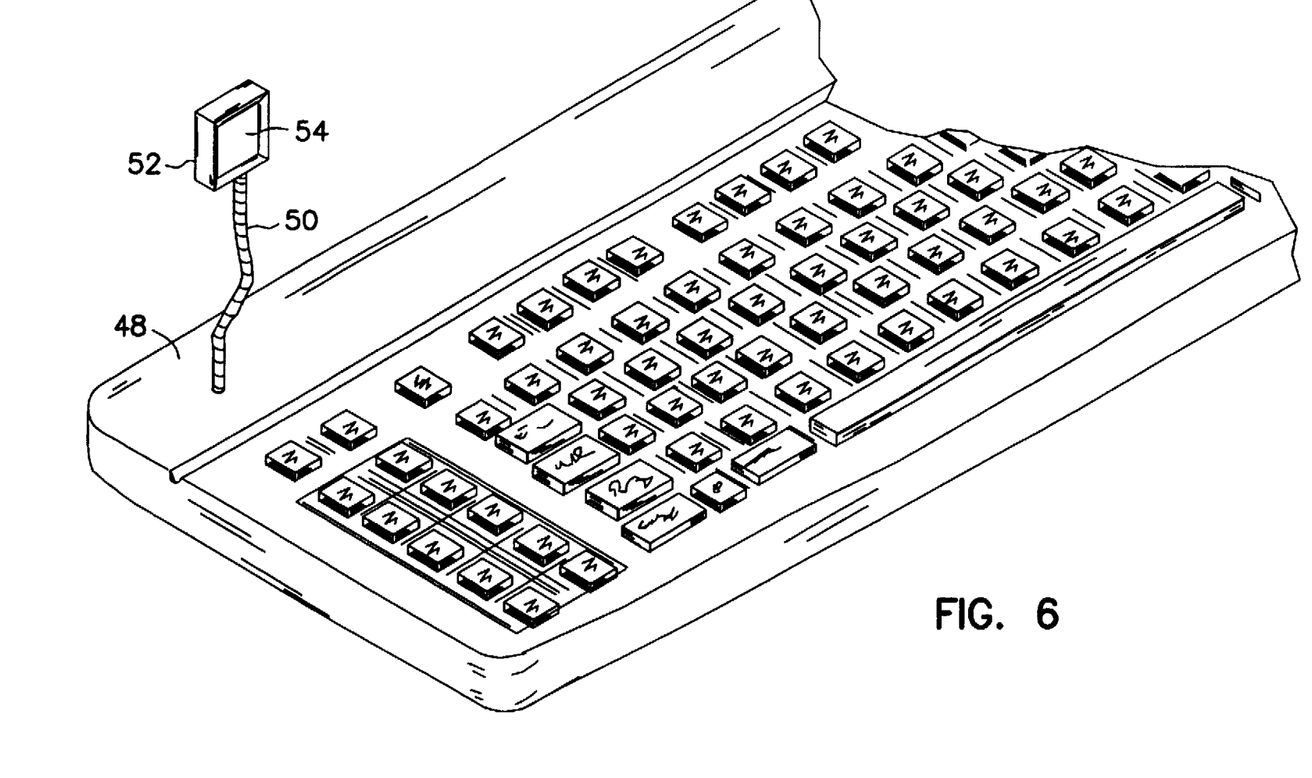
FIG. 6 is a perspective view of another embodiment of an infrared device according to the present invention.

Referring now to FIG. 6, another embodiment of an infrared device according to the present invention is shown. As shown in FIG. 6, external surface 48 is any external surface of a computer, keyboard, or monitor—for example, computer 10 of FIG. 1, keyboard 20 of FIG. 2, or monitor 26 of FIG. 3. Infrared device 52 comprises infrared transmission opening 54, which protects an infrared transceiver disposed within device 52 (not shown). Infrared device 52 is mounted to external surface 48 by a flexible tension cable 50. Flexible tension cable 50 permits a user to aim infrared device 52 in any direction without moving the computer, keyboard or monitor of which external surface 48 is a part.

Figure 7:
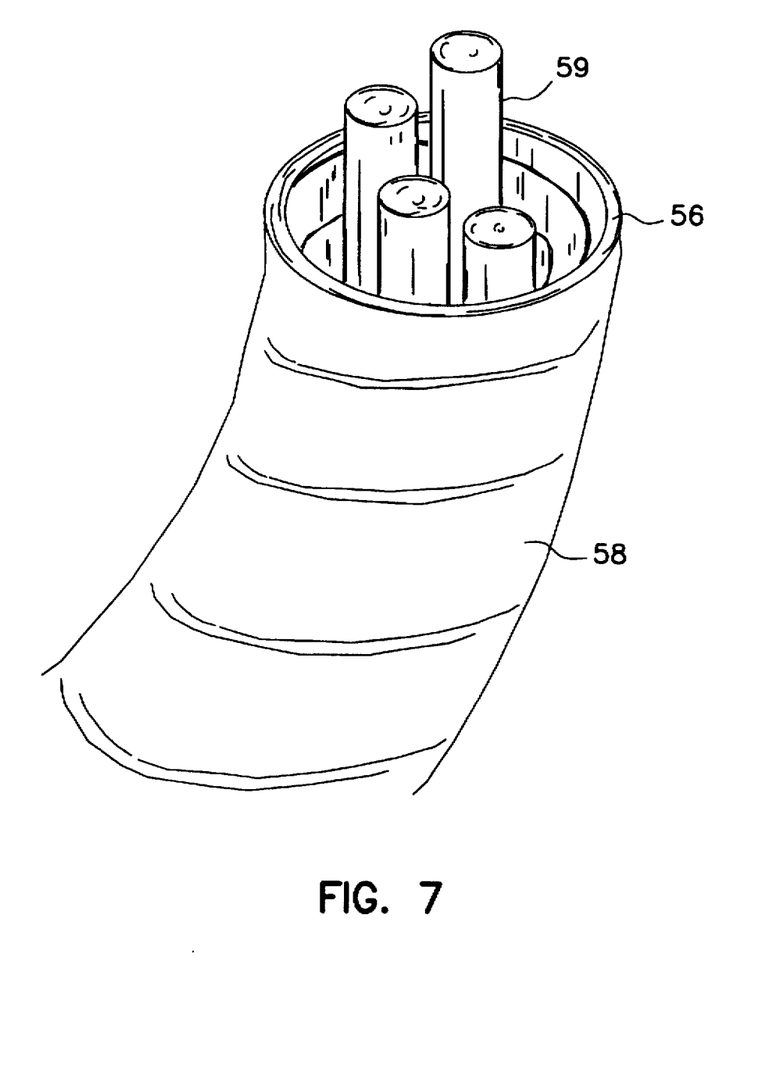
FIG. 7 is a sectional top view of the tension cable of the embodiment of FIG. 6.

A cross section of the top view of flexible tension cable 50 is shown in FIG. 7. The flexible tension cable typically includes coiled metal shell 56 surrounding conduit 58. Coiled metal shell 56 is amenable to bending at any point within the rod. Furthermore, coiled metal shell 56 retains the shape in which it is bent. In this manner, flexible tension cable 50 of FIG. 6 can be bent to point infrared device 52 in a particular direction; once pointed in the particular direction, coiled metal shell 56 will retain its shape so that flexible tension cable 50 remains pointed in the desired direction. Coiled metal shell 56 protects conduit 58, and can be constructed of a tactile surface so that the user can easily grip flexible tension cable 50.

Infrared device 52 is also electrically coupled to the component of which external surface 48 is a part, for example a computer, keyboard or monitor, as those skilled in the art will readily appreciate. The present invention is not limited to the manner in which device 52 is electrically coupled to this component. However, in one embodiment of the invention, electrical wires or cables 59 connect device 52 to the component through conduit 58, which is hollow to accommodate the insertion of the electrical wire or cable. The electrical coupling permits device 52 to send electrical signals received at device 52 to the component, and to receive electrical signals from the component as well.

Figure 8:
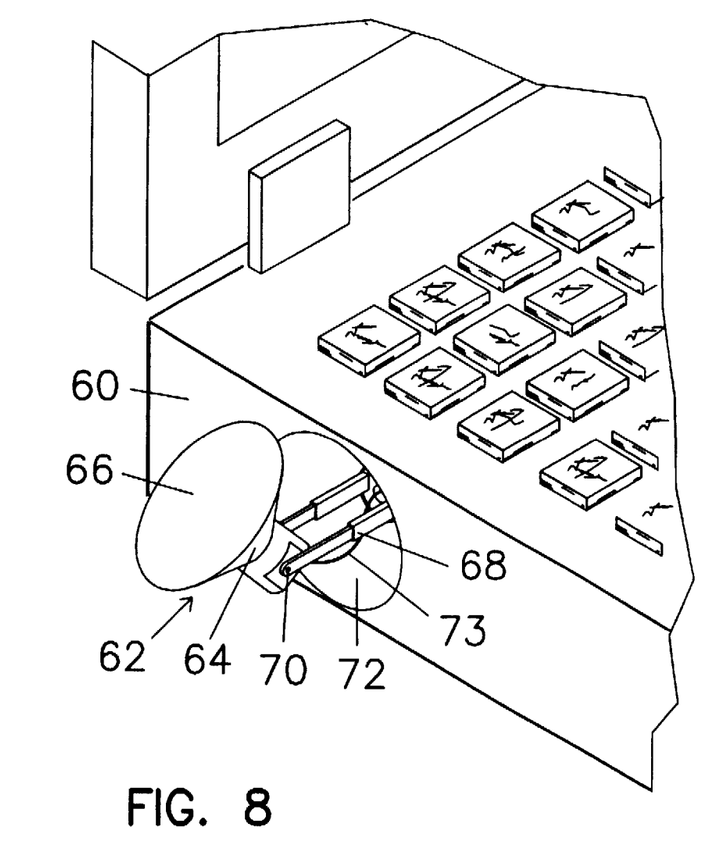
FIG. 8 is a perspective view of yet another embodiment of an infrared device according to the present invention.

Referring now to FIG. 8, yet another embodiment of an infrared device according to the present invention is shown. As shown in FIG. 8, external surface 60 is any external surface of a computer, keyboard, or monitor—for example, computer 10 of FIG. 1, keyboard 20 of FIG. 2, or monitor 26 of FIG. 3. Infrared device 62 has dish 64 in which an infrared transceiver (not shown) is disposed. Infrared transmission opening 66 protects the infrared transceiver, and as shown in FIG. 8 is mounted at the wide end of dish 64. Telescoping arm 68 of infrared device 62 mounts device 62 to external surface 60. Arm 68 mounts to dish 64 at end 70 of arm 68 such that dish 64 may rotate about arm 68 at end 70. Thus, infrared device 62 can be aimed in a desired direction without having to move the computer, keyboard or monitor of which surface 60 is a part.

Infrared device 62 is also electrically coupled to the component of which external surface 60 is a part, for example a computer, keyboard or monitor, as those skilled in the art will readily appreciate. The present invention is not limited to the manner in which device 62 is electrically coupled to this component. However, in one embodiment of the invention, electrical wire or cable 73 connects device 62 to the component through telescoping arm 68, in which case arm 68 is hollow to accommodate the insertion of the wire or cable, or running along telescoping arm 68. Wire or cable 73 is shown in each of FIG. 8, FIG. 9, and FIG. 10. The electrical coupling permits device 62 to send electrical signals received at device 52 to the component, and to receive electrical signals from the component as well.

As shown in FIG. 8, infrared device 62 is in an extended position from surface 60. However, surface 60 has a cavity 72 corresponding to the shape of device 62 to allow the device to be stored such that opening 66 is largely flush with surface 60. In other words, when the computer, keyboard or monitor of which surface 60 is a part is not in use, device 62 resides within the computer, keyboard or monitor so that it does not become damaged or is otherwise extended. Device 62 is extended as is shown in FIG. 8 typically only when it is in use. That is, device 62 can be positioned in at least two positions: a first position in which it is recessed within a cavity of surface 60, and at least one second position in which it is extended from the cavity of surface 60.

Figure 9:
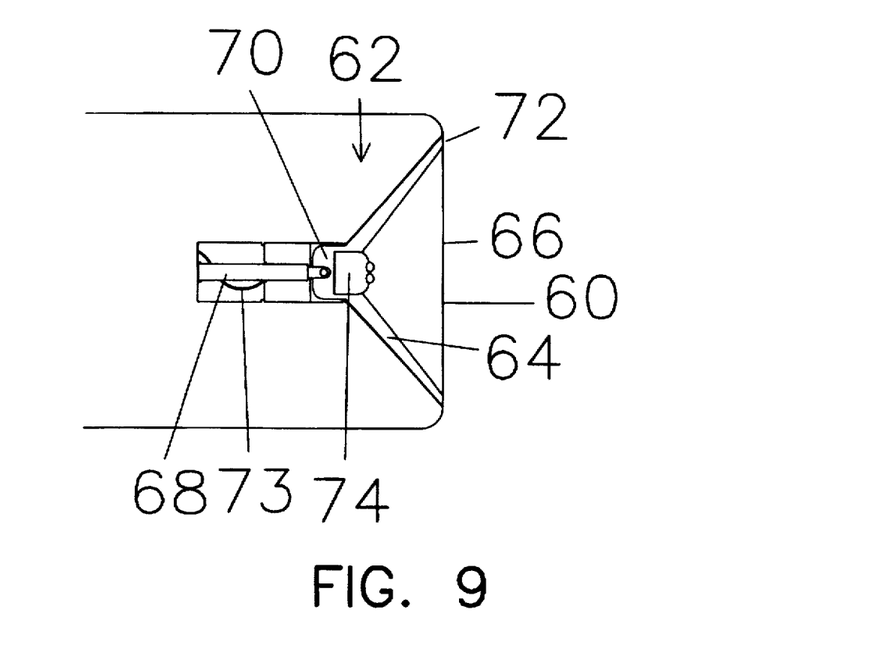
FIG. 9 is a sectional side view of the embodiment of FIG. 8 in a recessed position.
Figure 10:
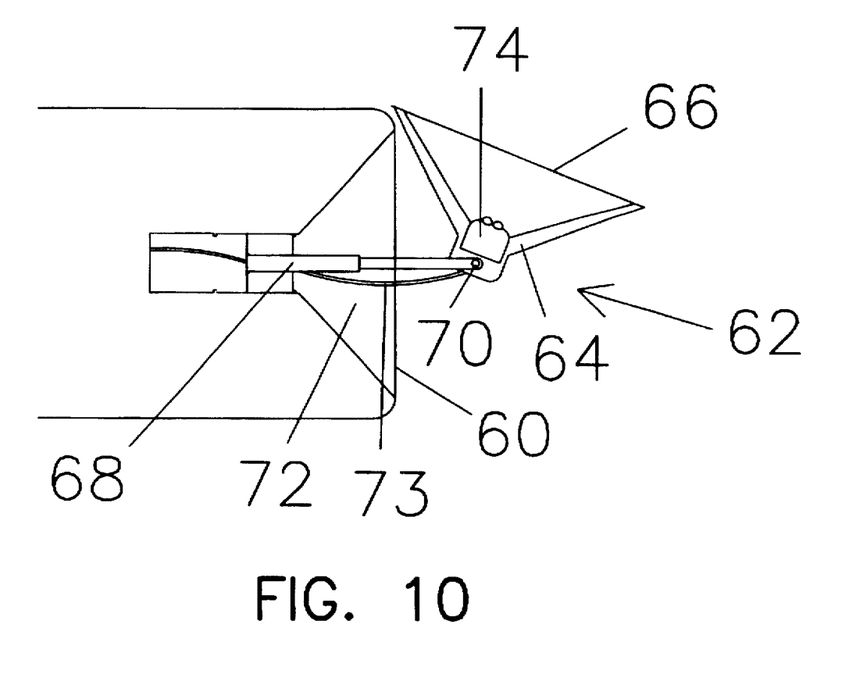
FIG. 10 is a sectional side view of the embodiment of FIG. 9 in an extended position.

This is better shown by reference to FIG. 9 and FIG. 10. Referring now to FIG. 9, a sectional side view of infrared device 62 recessed within cavity 72 of surface 60 is shown. As shown, cavity 72 is shaped such that dish 64 of device 62 fits within cavity 72 so that opening 66 is flush with surface 60. Telescoping arm 68 of device 62 also fits within cavity 72, and as is the case in FIG. 8, connects to dish 64 at end 70 of arm 68. In this position, as shown in FIG. 9, dish 64 cannot rotate because cavity 72 is shaped such that surface 60 surrounds dish 64 closely. Also shown in FIG. 9 is infrared transceiver 74, which lies at the small end of dish 64.

Referring now to FIG. 10, a sectional side view of infrared device 62 extended from cavity 72 of surface 60 is shown. As shown, telescope arm 68 of device 62 is fully extended, and dish 64 of device 62 is tilted upward at end 70 of arm 68. Thus, dish 64 can be rotated at end 70, because it is not surrounded by cavity surface 60 when device 62 is in the extended position from cavity 72. This enables infrared transceiver 74 to receive and send infrared signals at an upward direction as compared to the rightward direction in which cavity 72 of surface 60 is pointed. That is, such signals pass through opening 66 to and from transceiver 74.

Figure 11:
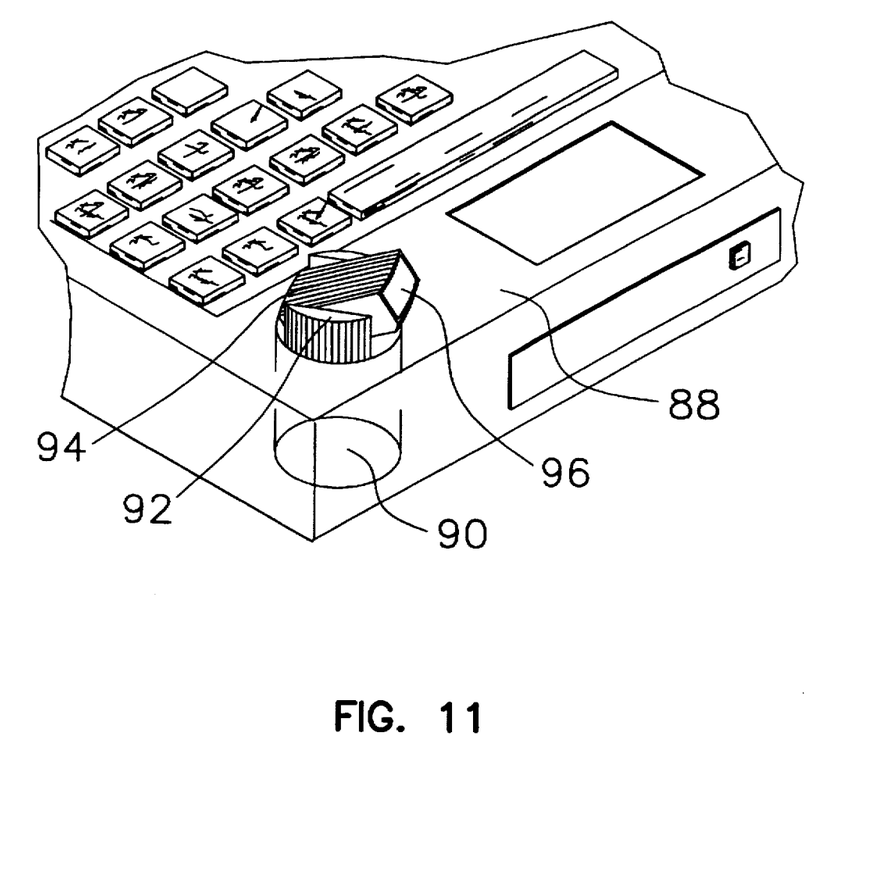
FIG. 11 is a perspective view of another embodiment of an infrared device according to the present invention.

Referring now to FIG. 11, still yet another embodiment of an infrared device according to the present invention is shown. As shown in FIG. 11, external surface 88 is any external surface of a computer, keyboard, or monitor—for example, computer 10 of FIG. 1, keyboard 20 of FIG. 2, or monitor 26 of FIG. 3. Infrared device 92 has tilting member 94 mounted rotatably in a cavity therein. Tilting member 94 has an infrared transceiver (not shown) disposed therein. Infrared transmission opening 96 protects the infrared transceiver, and as shown in FIG. 11 is mounted at one end of tilting member 94. Device 92, including tilting member 94, can be rotated about a first axis within cavity 90 of surface 88 as is shown, and as is understood by those of ordinary skill within the art. Furthermore, tilting member 94 can be rotated about a second axis perpendicular to the first axis, as is also shown. Thus, infrared device 92 can be aimed in a desired direction without having to move the computer, keyboard or monitor of which surface 88 is a part.

As shown in FIG. 11, infrared device 92 is in an extended position from surface 76. However, cavity 90 of surface 88 has a shape corresponding to the shape of device 92 to allow the device to be stored such that the top exterior surfaces of device 92 and tilting member 94 are largely flush with surface 88. In other words, when the computer, keyboard or monitor of which surface 88 is a part is not in use, device 92 resides within the computer, keyboard or monitor so that it does not become damaged or is otherwise extended. Device 92 is extended as is shown in FIG. 11 typically only when it is in use. That is, device 92 can be positioned in at least two positions: a first position in which it is recessed within a cavity of surface 88, and at least one second position in which it is extended from the cavity of surface 88.

Still referring to FIG. 11, tilting member 94 rotates about an axis within a cavity of device 92. Tilting member 94 is adjustably mounted within device 92 in one embodiment in the same manner in which device 36 is mounted in surface 32 as shown in FIG. 5. Therefore, reference should be made to the discussion in conjunction with FIG. 5 for further understanding thereto. That is, in one embodiment, tilting member 94 has pegs on two opposing sides that fit into and correspond to two holes on the sides of device 92 that define the cavity of device 92 in which member 94 is mounted. The pegs fit into the holes such that member 94 can rotate within the cavity of device 92.

Figure 12:
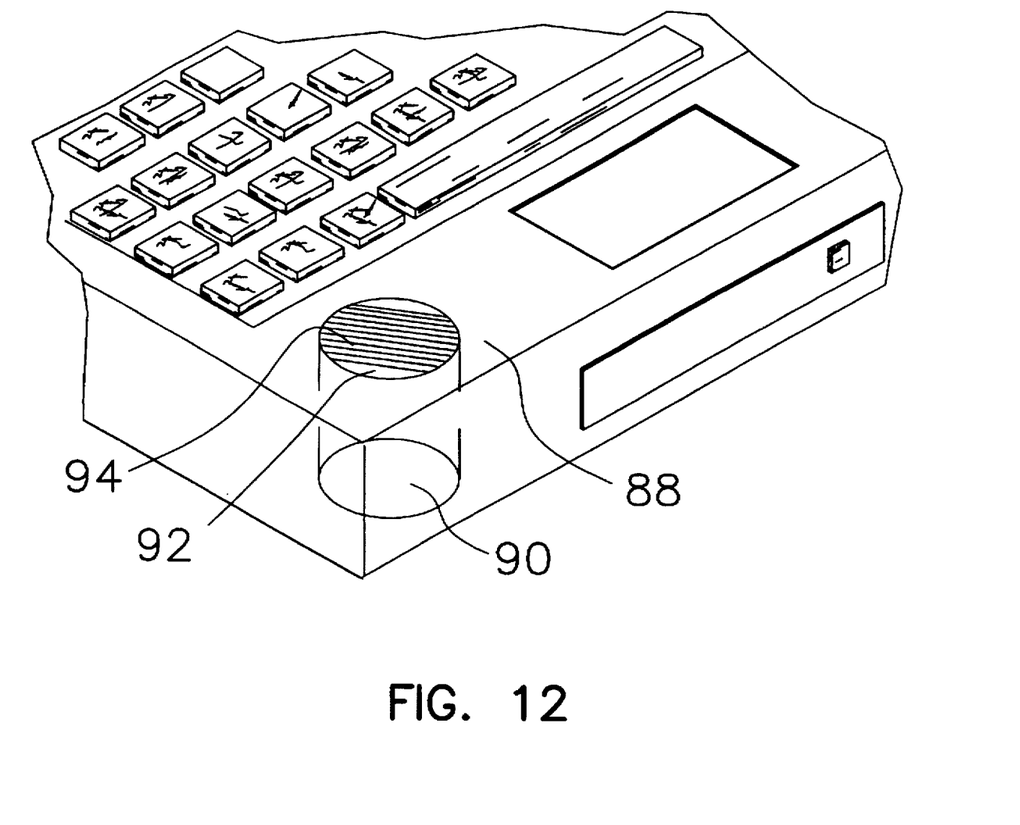
FIG. 12 is a perspective view of the embodiment of FIG. 11 in a recessed position.
Figure 13:
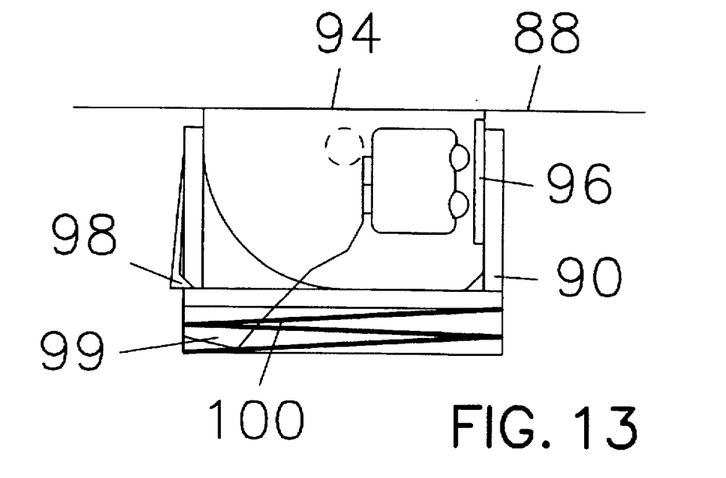
FIG. 13 is a sectional side view of the embodiment of FIG. 11 in an extended position; and, FIG. 14 is a sectional side view of the embodiment of FIG. 11 in a recessed position.
Figure 14:
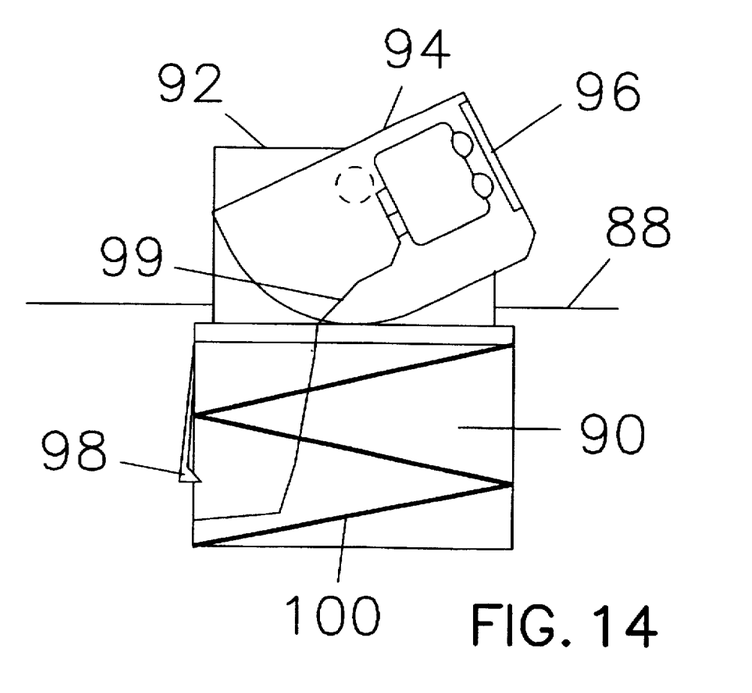

Referring now to FIG. 12, a perspective view of device 92 of FIG. 11 in the recessed position within cavity 90 of surface 88 is shown. The top surface of device 92 and the top surface of tilting member 94 in this position are flush with surface 88. Referring now to FIG. 13, a sectional side view of device 92 of FIG. 11 in the extended position is shown. Forcing mechanism 100 permits device 92 to "pop up" from the position shown in FIG. 12 to an extended position, such as that shown in FIG. 11. Thus, a user presses on the top surface of device 92 or member 94 while device 92 is in the recessed position in order for the device to pop up to an extended position. The user then presses on either top surface again until the device is in the recessed position. Forcing mechanism 100 couples to locking mechanism 98. Referring now to FIG. 14, a sectional side view of device 92 of FIG. 11 in the recessed position is shown. Locking mechanism 98 permits the device to remain in the recessed position. As shown, locking mechanism 98 latches the lower edge of device 92 so that device 92 is recessed within surface 88. The present invention is not limited to any particular forcing mechanism or locking mechanism. In one embodiment of the invention, forcing mechanism 100 is a spring-loaded mechanism, as those skilled in the art will readily appreciate.

Infrared device 92 is also electrically coupled to the component of which external surface 88 is a part, for example a computer, keyboard or monitor, as those skilled in the art will also readily appreciate. The present invention is not limited to the manner in which device 92 is electrically coupled to this component. In one embodiment of the invention, an electrical wire or cable (such as wire or cable 99 as shown in FIG. 13 and FIG. 14) connects device 92 to the component. The electrical coupling permits device 92 to send electrical signals received at device 92 to the component, and to receive electrical signals from the component as well.

Those of ordinary skill in the art will also readily appreciate that many changes and modifications to the above drawings and description can be made without departure from the spirit or scope of the following claims. For example, the invention has been shown to encompass several different embodiments that provide for an integral adjustably mounted infrared device within a computer, keyboard, or monitor. However, modification of the present invention can be made to include any other embodiments within the scope of the following claims.

I claim:

1. An electronic device comprising:

a housing having a pair of holes, each hole defined within a surface of the housing parallel to the surface of the housing within which the other hole is defined;

a casing having a pair of pegs, each peg protruding from a surface of the casing in a parallel but opposite direction to the direction of the other peg, the casing mounted in a rotatably adjustable manner to the housing via the pair of pegs fitting into the pair of holes within the housing to permit rotation of the casing about an axis of rotation independent of movement of the housing; and, an infrared device contained within the casing.

2. The electronic device of claim 1, wherein the infrared device comprises an infrared transceiver, and the casing comprises a transmission opening disposed within an exterior surface of the casing over the transceiver.

3. The electronic device of claim 1, wherein the casing has a generally cylindrical shape.

4. The electronic device of claim 1, wherein the electronic device is a computer.

5. The electronic device of claim 1, wherein the electronic device is a keyboard for a computer.

6. The electronic device of claim 1, wherein the electronic device is a monitor for a computer.

7. The electronic device of claim 1, wherein the electronic device is a printer for a computer.

* * * * *